July 28, 1970            L. J. KINNEY            3,522,000
METHOD AND APPARATUS FOR COOLING AND PURIFYING GASEOUS
PRODUCTS OF COMBUSTION
Filed Sept. 6, 1967
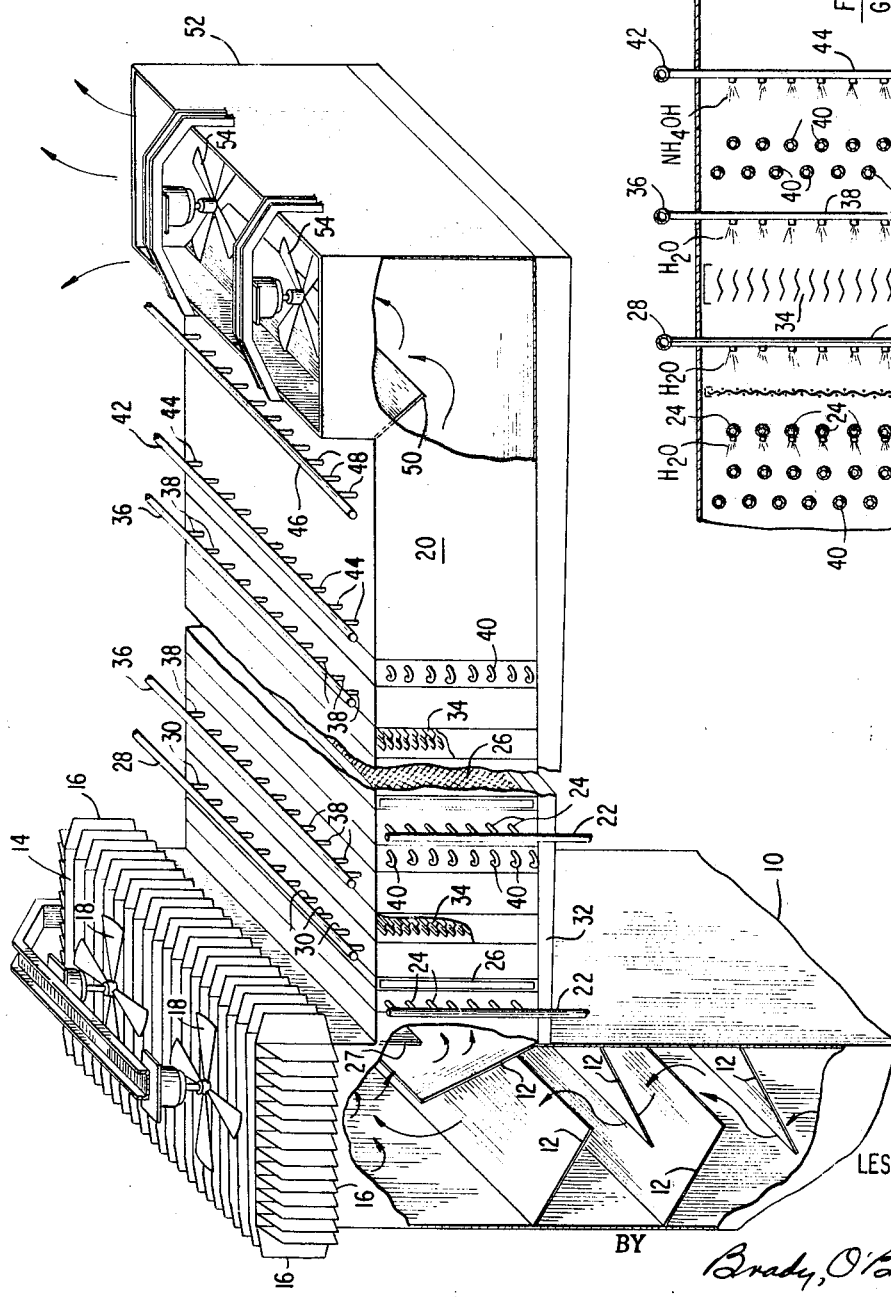
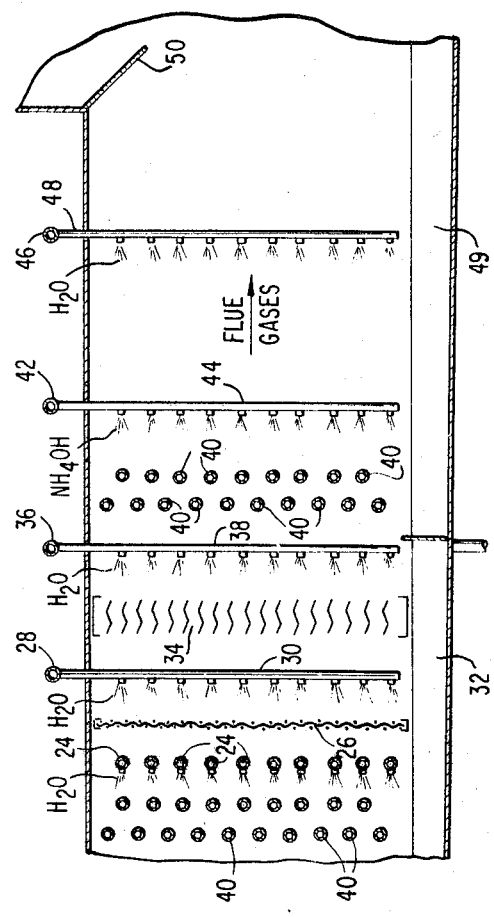
INVENTOR
LESLIE JUNIOR KINNEY
BY
Brady, O'Boyle & Gates
ATTORNEY United States Patent Office 3,522,000
Patented July 28, 1970

3,522,000
METHOD AND APPARATUS FOR COOLING AND PURIFYING GASEOUS PRODUCTS OF COMBUSTION
Leslie Junior Kinney, Chillum, Md., assignor to Chillum Sheet Metal, Inc., Bladensburg, Md., a corporation of Maryland
Filed Sept. 6, 1967, Ser. No. 665,890
Int. Cl. B01d 47/00
U.S. Cl. 23—2                                    10 Claims

ABSTRACT OF THE DISCLOSURE

The present invention discloses a method and apparatus for removing ash and other particles suspended in a moving stream of hot gases, such as smoke, as well as cleansing these gases of any nauseous, toxic or otherwise undesirable pollutants by means of treating the gases with a series of cleansing and cooling steps including water sprays, screens and baffles, and additionally includes as one of the final steps a spray of a chemical reagent such as ammonium hydroxide for combining with any of the remaining pollutants such as sulfur dioxide to form water soluble components which are then removed by means of a final water spray.

BACKGROUND OF THE INVENTION

The purification or cleaning of gaseous products of combustion to eliminate smoke and fly ash presents a serious problem. In fact, today air pollution is a hazard of national scope and is receiving a great deal of attention not only from health authorities but also from legislators. The problem is not a new one; however, with the ever-increasing urban population, air pollution threatens the very lives of urban as well as suburban inhabitants.

Combined with the problem of air pollution is the disposal of waste materials in large cities or congested areas. Waste materials, such as garbage, papers, etc., must be disposed of and the ordinary method of disposal is by burning. In burning this material, smoke and obnoxious gases are produced. City ordinances in some instances specify that the production of such smoke and obnoxious gases must be curtailed or completely eliminated.

Apparatus for treating smoke and gases of combustion are well known to those skilled in the art. For example, the following-listed patents are typical illustrative examples of the state of the art:

U.S. Pats. Nos. 1,866,193, Coutant; 1,639,179, Hamel; 2,802,543, Clark; 2,833,528, Schroder; 2,976,949, Murphy; 3,237,381, Hvostoff.

The above-cited prior art discloses that it is well known to treat smoke and other gases by means of a series of cleaning or scrubbing means to remove solid particles held in suspension. It should also be pointed out that the Hvostoff et al. patent additionally discloses the use of an ammonia spray in the initial stage of the apparatus. This arrangement has an inherent limitation due to the fact that incoming gases arriving at extremely high temperatures such as the heat of combustion make this step of little use under the conditions of incineration.

The Hvostoff patent basically describes a hood of the type used in a chemistry laboratory for the control of noxious and toxic gases. Certain reagents even when stored in closed containers give off harmful vapors which should not be allowed to circulate. Good examples are bromine and fuming sulfuric acid. In addition, many reagents while they are reacting in a controlled chemical reaction emit dangerous gases and vapors which could be harmful to the surrounding area. Thus a hood must be used. However, in these examples there is not a tremendous amount of heat and an onrush of gases that can be expected in an incendiary system. In other words, under the comparatively mild condition of a chemistry laboratory, the addition of ammonia may be a primary step since there is no problem with temperature or a tremendous rush of a great many of gases which can be anticipated in an incendiary system.

Where the primary concern is to remove the undesirable pollutants produced by incineration, the addition of ammonium hydroxide at the input could have a disastrous effect since a huge volume of high temperature gases composed of many different elements moving at a rapid pace produces vacillating conditions in which the gases are prone to intermingle to form unstable intermediate compounds which could react violently with or in the presence of the ammonium hydroxide.

It should be noted also that the introduction of ammonium hydroxide at the high temperature input will simply volutize to form ammonia and water in the form of steam. Where a primary purpose of the apparatus is to eliminate sulfur dioxide as is contemplated with the present invention, the presence of sulfur dioxide at that stage would produce an ammonium sulfite salt which has a sublimation temperature of 312 degrees Fahrenheit. It is obvious therefore that if such a reaction did occur the ammounium sulfite would immediately go from the solid to the gaseous state again and no cleansing action would have been performed. It has been discovered, on the other hand, that if ammonium hydroxide is added subsequent to a series of cooling and washing steps, the desired elimination of sulfur dioxide will be accomplished more readily and with more predictable and efficient results.

SUMMARY OF THE INVENTION

The subject invention contemplates a method and apparatus for cleaning and purifying gaseous products of combustion by first directing the smoke and gases produced as the result of incineration into a heat exchanger comprising an air-cooled heat sink. Secondly, the gases are directed from the heat exchanger through a chamber comprising one or more water sprays, screens and baffles for providing a predetermined number of washing and cooling steps to remove suspended particles and those gases which are soluble in water as well as conditionally lowering the outside temperature of the gases to a predetermined temperature, e.g., ambient air temperature or more preferably 70 degrees Fahrenheit. Thirdly, when the temperature of the gases has been reduced to said predetermined temperature, a spray of a reagent such as ammonium hydroxide is directed into the stream of the remaining undesirable gases for reacting with the remaining undesirable gases to form water soluble compounds. Finally, a terminal water spray is provided to remove the soluble products produced by the ammonium hydroxide spray. Subsequent to the final water spray, the completely cleansed gases are fed into the surrounding atmosphere from an exit port which may be, for example, a stack.

BRIEF DESCRIPTION OF THE DRAWINGS

FIG. 1 is a fragmentary perspective view of the preferred embodiment of the subject invention; and FIG. 2 is a fragmentary side elevational view, partly in section, of the apparatus shown in FIG. 1.

DESCRIPTION OF THE PREFERRED EMBODIMENT

FIG. 1 discloses apparatus for removing smoke from the flue gases of a furnace or incinerator and comprises a stack or chimney 10 in which a plurality of angularly disposed baffles 12 are located on opposite sides of the inner walls thereof for providing a tortuous path for the flue gases going up the stack. The baffles 12 are designed and placed at a desired angle with respect to the horizontal plane to break up any large particles which are suspended in the flue gases. Upon leaving the vicinity of the baffles 12, the flue gases enter a heat exchange unit 14 which is located at the upper terminal portion of the stack 10. The heat exchange unit 14 comprises a mechanical heat sink and includes a plurality of heat dissipators 16 in the form of fins projecting outwardly from the sides thereof. One or more rotating fan units 18 are positioned over the upper surface for aiding the dissipation of heat away from the fins 16.

The relatively cooler flue gases in the heat exchange unit 14 are forced by the rising hotter gases into a treatment chamber unit 20 which is coupled into the side of the stack 10 below the heat exchanger 14. The treatment chamber 20 extends substantially in a horizontal plane with respect to the stack 10. The treatment chamber 20 consists of an enclosure which incorporates a plurality of washing, cleaning and cooling stages as well as a final stage wherein a spray of ammonium hydroxide is directed into the stream immediately prior to at least one final washing stage, at which time the now cleansed flue gas is directed into the atmosphere.

More particularly, FIG. 1 discloses a fragmentary portion of the treatment chamber 20 comprising a header 22 feeding a plurality of transversely disposed fine mist spray units 24 including jets, not shown, which are directed toward the incoming flue gases. The spray comprises a water spray and the mist created mixes with the incoming gases as well as saturates the suspended particles therein. The incoming gases are additionally cooled thereby and a baffle unit 27 is located at the upper portion of the input port of the treatment chamber 20 for trapping any steam which is created due to the water spray units 24. Following the fine water spray, the gases are directed through a screen 26 which extends completely across the chamber 20 for trapping any relatively large particles contained in the flue gases. A high pressure header 28, feeding a plurality of high pressure sprays 30 including nozzles not shown, are located behind and directed towards the screen 26 for washing the screen free of any particles trapped thereby whereupon such particles fall to a settling pan 32 running along the bottom portion of the treatment unit 20. Following the high pressure spray played on the screen 26 is a baffle unit 34 which is preferably a plurality of metal units having irregular surfaces which are parallely disposed with one another. The irregular surfacese, for example, may take the form of Z's or W's. The purpose of the baffle unit 34 is to further trap and remove from the flue gas additional particles suspended and not removed by the screen 26. A second high pressure header 36 feeds a second plurality of high pressure water sprays 38 including nozzles, not shown, which are directed toward the baffle unit 34 for removing any particles accumulated thereon. The wash from the baffle unit 34 is carried to the drain pan 32 whereupon it is fed to a settling tank, not shown. When desirable, the water used for the fine spray unit 24 and the two high pressure spray units 30 and 38 may be pumped from the settling tank, cleaned and recirculated to the headers 22, 28 and 36 so that a closed system might be provided. The baffle unit 34 provides additional cooling of the flue gases. Additionally, an array of cooling coils 40 are disposed across the chamber aft of the baffle unit 34 to provide a distinct cooling stage after the water sprays.

In the subject embodiment, the identical process is repeated again with the fine water spray 24 and the metal screen 26 being shown at the fragmentary cut in the drawing. Also, the final baffle unit stage 34 in combination with its associated high pressure spray 38 is disclosed as well as the last cooling stage including the cooling coils 40.

The last array of cooling coils 40 reduce the temperature of the gases to preferably 70° Fahrenheit, at which point an ammonium hydroxide spray is directed against the flow of the gases by means of a spray unit comprising header 42 and vertically disposed spray units 44 including nozzles, not shown. The ammonium hydroxide reacts chemically with the remaining pollutants, particularly sulfur dioxide, to form water soluble compounds. Following the ammonium hydroxide spray stage is at least one water spray comprising header 46 and vertically disposed spray units 48 which are included to dissolve and precipitate the water soluble compounds formed by means of the ammonium hydroxide spray. The final water spray is collected in a second drain pan 49 which leads to a separate settling tank, not shown, where the dissolved compounds may be retrieved. A final baffle 50 is angularly disposed with respect to the path of the flue gases to trap any moisture which may be accumulated at that point.

The cleansed flue gases are then directed into a vertical stack 52 which includes one or more fan units 54 disposed in the exit port of the stack 52. These fans are used to not only draw the cleansed gases up through the stack to the atmosphere but also enhance the flow of the flue gases through the treatment chamber 20 from the heat exchanger 14.

Further illustrative of the apparatus shown in FIG. 1 is the fragmentary view shown in FIG. 2 which discloses the terminal stages of the apparatus including the next-to-last and last cooling coil units 40, the fine water spray unit 24, the last screen 26, and baffle unit 34 with their respective high pressure sprays 30 and 38. The ammonium hydroxide spray 44 is shown directed towards the oncoming gases as well as the final water spray 48 which is used to dissolve the water soluble compound formed by the reaction of the ammonium hydroxide with the remaining pollutants in the air stream.

What has been shown and described therefore is a new, improved method and apparatus for cleansing and purifying gaseous products of combustion. It is not desired, therefore, that the invention be limited to the specific arrangements shown and described. For example, the number of sprays and baffles and the length of the treatment unit may vary according to the volume and temperature of the gases being treated. Furthermore, other cooling tubes or other such devices may be incorporated into the system to aid in lowering of the gas temperature. Also, the high pressure water sprays may, when desirable, be rotatable and electrostatic methods may be incorporated into the subject invention for removal of particles. It is even foreseeable that where a relatively large number of stages are incorporated into the treatment unit, supplementary fan devices may be provided to augment the movement of the gases through the system. It is to be understood therefore that all equivalent alterations and modifications within the spirit and scope of the present invention are herein meant to be included.

I claim:
1. A method for cleaning and purifying products of combustion resulting from incineration including smoke and gases produced thereby comprising the steps of:
  feeding said products of combustion into a treatment chamber and spraying said products of combustion with a first water spray to saturate any suspended particles in said smoke and mix with any gases soluble with water;
  screening said products of combustion by means of a screen to remove relatively large particles suspended therein;
  simultaneously washing said screen with a second water spray for cleaning said screen and to further reduce the temperature of said products of combustion;
  removing other suspended particles by feeding said products of combustion through a tortuous path baffle means;

simultaneously washing said baffle means with a third water spray for cleaning said baffle means and to further reduce the temperature of said products of combustion;

cooling said products of combustion remaining down to a predetermined lower temperature;

spraying said smoke and other gaseous products at said predetermined temperature with an aqueous alkaline spray to chemically react with any of the remaining products of combustion, particularly sulfur dioxide, to form water soluble compounds; and spraying said water soluble compounds with at least one water spray to dissolve and precipitate said water soluble compounds.

2. The invention as defined in claim 1 wherein said spraying with said aqueous alkaline spray comprises spraying with ammonium hydroxide.

3. The method as defined in claim 2 wherein said predetermined lower temperature is ambient outside air temperature.

4. The method as defined in claim 2 wherein said predetermined lower temperature is substantially 70° Fahrenheit or less.

5. The method as defined in claim 1 and additionally including a preliminary cooling step prior to feeding said products of combustion into said treatment chamber.

6. Apparatus for removing smoke and other gases of combustion resulting from incineration including particles suspended therein comprising in combination:

heat exchanger means located in the path of said smoke and other gases for providing a preliminary cooling of said smoke and other gases;

a treatment chamber located adjacent to said heat exchanger, being operatively connected thereto, to receive said smoke and other gaseous products of combustion which have been cooled thereby and comprising, (a) first spray means located in said treatment chamber for providing a fine water spray into said smoke and other gaseous products to remove suspended particles therein which are soluble in water as well as reducing the temperature thereof;

(b) screening means located in and across the interior of said treatment chamber behind said first spray means for removing relatively large particles held in suspension;

(c) first washing means located in said treatment chamber behind and directed toward said screening means for removing by washing suspended particles trapped by said screening means;

(d) baffle means located in said treatment chamber behind said first cleaning means for further removing particles held in suspension as well as further reducing the temperature of said smoke and other gases;

(e) second washing means located in said treatment chamber behind and directed toward said baffle means for removing by washing particles trapped thereby;

(f) cooling means located in said treatment chamber behind said second cleaning means for reducing the temperature of said smoke and other gaseous products of combustion to a predetermined temperature;

(g) reagent spray means located behind said cooling means and being adapted to provide an aqueous alkaline spray chemically reacting with the remaining impurities to form water soluble compounds therewith;

(h) final spray means located behind said reagent spray means, providing a water spray to dissolve and precipitate any of the newly formed water soluble compounds; and means coupled to said treatment chamber for feeding the cleansed gas into the atmosphere.

7. The apparatus as defined in claim 6 wherein said first and second washing means comprises water sprays.

8. The apparatus as defined in claim 6 wherein said cooling means comprises an array of cooling coils for reducing the remainder of said smoke and other gases of combustion to a temperature of substantially 70° Fahrenheit or less.

9. The apparatus as defined in claim 6 wherein said aqueous alkaline spray comprises ammonium hydroxide.

10. The apparatus as defined in claim 6 and additionally including the plurality of angularly inclined baffles located in the path of said smoke and other gases of combustion resulting from incineration in front of said heat exchanger means and wherein said heat exchanger means comprises an air cooled heat sink including a plurality of heat dissipating elements located thereon and wherein said means for feeding the cleansed gas into the atmosphere additionally includes fan means located therein for forcing the cleansed gas into the atmosphere as well as enhancing the flow of gases through said treatment chamber.

References Cited

UNITED STATES PATENTS

| | | | |
|---|---|---|---|
| 971,297 | 9/1910 | Miles | 23—4 |
| 1,609,611 | 12/1926 | Dovel | 261—111 |
| 1,866,193 | 7/1932 | Coutant | 261—130 |
| 2,802,543 | 8/1957 | Clark | 55—242 X |
| 3,237,381 | 3/1966 | Hvostoff et al. | 55—223 X |
| 3,392,125 | 7/1968 | Kelly et al. | 23—2 X |

EARL C. THOMAS, Primary Examiner

U.S. Cl. X.R.

23—178, 260, 284; 55—73, 80, 96, 222, 223, 233, 242, 258, 260, 269, 316, 318, 442; 261—111, 117